(12) United States Patent
Han et al.

(10) Patent No.: US 10,389,012 B2
(45) Date of Patent: Aug. 20, 2019

(54) ANTENNA SYSTEM AND COMMUNICATION DEVICE CONTAINING THE SAME

(71) Applicant: AAC Technologies Pte. Ltd., Singapore (SG)

(72) Inventors: Hongjuan Han, Shenzhen (CN); Yuehua Yue, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/869,183

(22) Filed: Jan. 12, 2018

(65) Prior Publication Data

US 2018/0375196 A1    Dec. 27, 2018

(30) Foreign Application Priority Data

Jun. 22, 2017    (CN) .......................... 2017 1 0482838

(51) Int. Cl.
*H01Q 1/24*    (2006.01)
*H01Q 9/42*    (2006.01)
*H01Q 21/28*    (2006.01)
*H01Q 5/328*    (2015.01)
*H01Q 5/378*    (2015.01)

(52) U.S. Cl.
CPC ............. *H01Q 1/243* (2013.01); *H01Q 5/328* (2015.01); *H01Q 5/378* (2015.01); *H01Q 9/42* (2013.01); *H01Q 21/28* (2013.01)

(58) Field of Classification Search
CPC ...................................................... H01Q 1/243
See application file for complete search history.

(56) References Cited

U.S. PATENT DOCUMENTS

2018/0062270 A1*    3/2018    Liang .................... H01Q 1/243

* cited by examiner

*Primary Examiner* — Robert Karacsony
(74) *Attorney, Agent, or Firm* — Na Xu; IPro, PLLC

(57) ABSTRACT

The present disclosure relates to an antenna system and a communication device. The antenna system includes a rear housing, a metal middle frame including two side frame portions and a bottom frame portion, a mainboard and a first tuning switch. The bottom frame portion defines a first slit and a second slit and includes a first, second and third positions, a third slit communicated with the first and second slits is defined between the rear housing and the bottom frame portion along an extending direction of the side frame portion. The mainboard includes a feeding point, a first ground point and a second ground point, the feeding point connected with the first position, the first ground point connected with the second position, the second ground point connected with the third position by the first tuning switch, thereby forming a first antenna, a second antenna and a third antenna.

9 Claims, 3 Drawing Sheets

ANTENNA SYSTEM AND COMMUNICATION DEVICE CONTAINING THE SAME

TECHNICAL FIELD

The present disclosure relates to the field of antenna system technologies and, particularly, relates to an antenna system and a communication device containing the antenna system.

BACKGROUND

Currently, a communication device, such as mobile phone, having a metal housing, has becomes a mainstream structure of the mobile phones of various brands. When designing an antenna of the mobile phones, a slit is usually defined in the metal housing. Generally, by the slit through the housing along a width direction of the mobile phone, the housing is divided to form a three-piece structure including a top frame portion, a middle portion and a bottom frame portion, and then the slit is filled with a plastic member. Apparently, the slit area of such all-metal housing is relatively great, which influences a structural strength and a visual quality of the whole metal housing.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

REFERENCE SIGNS

10—rear housing;
20—metal middle frame;
  21—side frame portion;
  22—bottom frame portion;
    221—first slit;
    222—second slit;
    223—first position;
    224—second position;
    225—third position;
  23—top frame portion;
30—mainboard;
  31—feeding point;
  32—first ground point;
  33—second ground point;
40—first tuning switch;
50—third slit;
60—antenna unit;
70—second tuning switch;

The above-mentioned drawings as a part of the specification are incorporated herein into the specification, which show the embodiments according to the present disclosure, and are used for illustrating a principle of the present disclosure.

DESCRIPTION OF EMBODIMENTS

The present disclosure will be described in detail below by the following embodiments with reference to the accompanying drawings.

Figure 1:
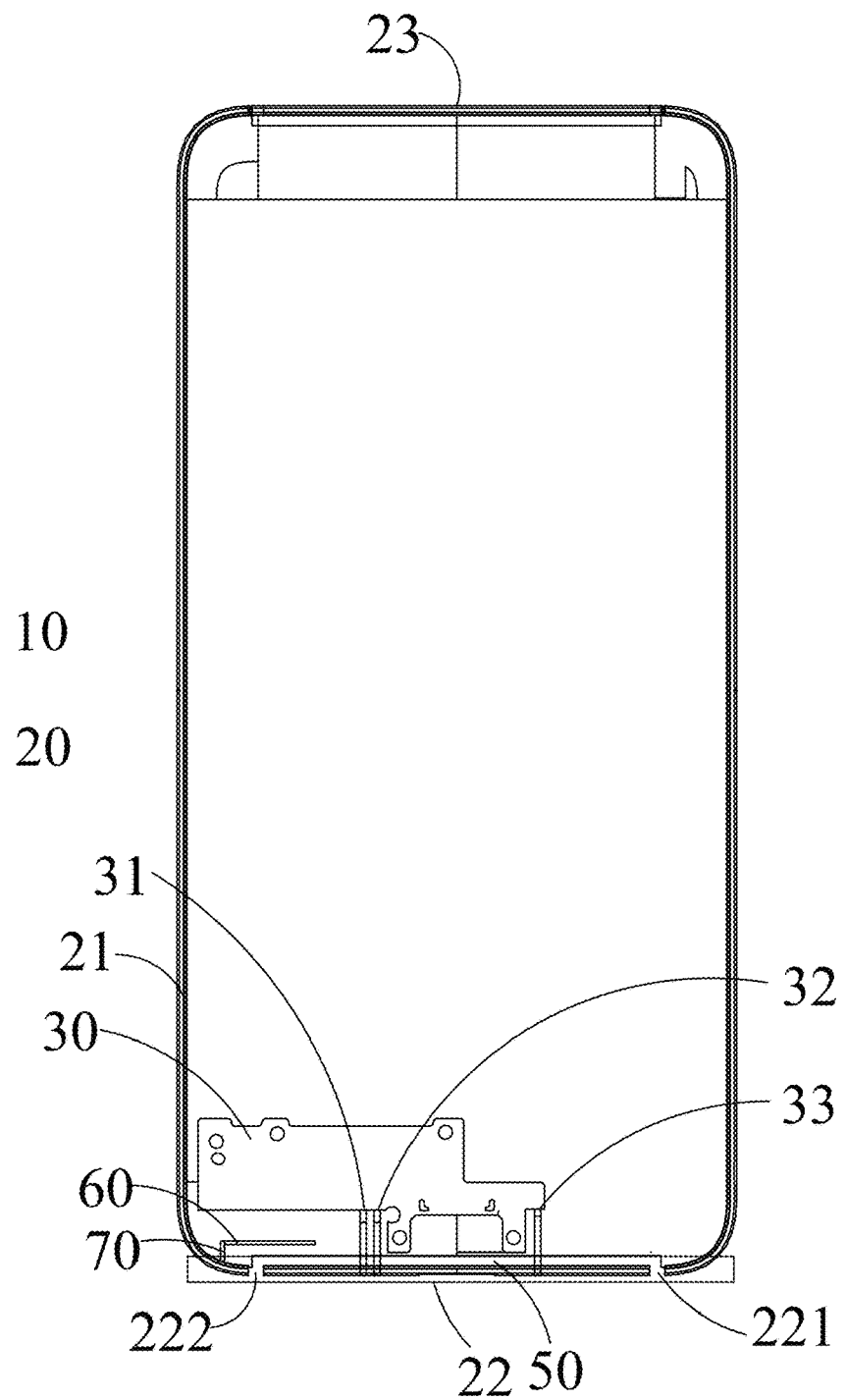
FIG. 1 is a structural schematic diagram of an antenna system according to an embodiment of the present disclosure.
Figure 2:
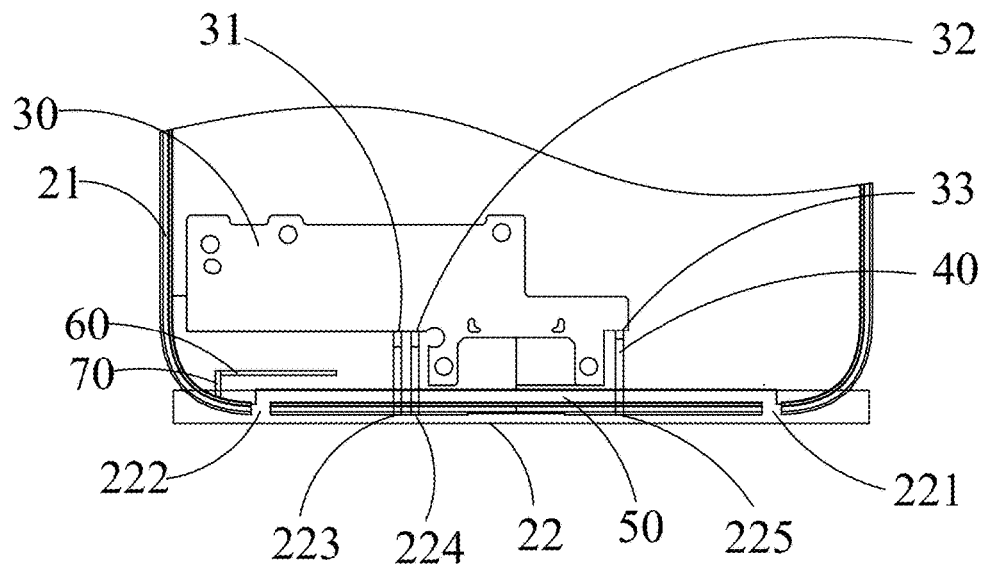
FIG. 2 is a partial, structural schematic diagram of an antenna system according to an embodiment of the present disclosure.
Figure 3:
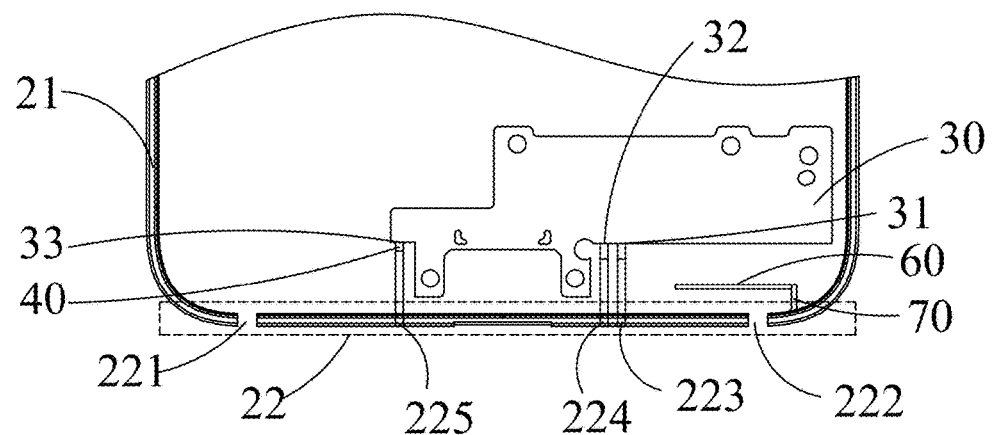
FIG. 3 is a back view of an antenna system according to an embodiment of the present disclosure, without showing a rear housing.

As shown in FIGS. 1-3, the embodiment of the present disclosure provides an antenna system, which can be used for a mobile terminal, such as mobile phone. The antenna system includes a rear housing 10, a mainboard 30, a first tuning switch 40, and a metal middle frame 20 circumferentially surrounding and connected with the rear housing 10. As shown in FIG. 1, the metal middle frame 20 includes two side frame portions 21 opposite to each other, a bottom frame portion 22 connecting the two side frame portions 21, and a top frame portion 23 opposite to the bottom frame portion 22. The top frame portion 23, one side frame portion 21, the bottom frame portion 22, and the other side frame portion 21 are sequentially connected head to tail to form the metal middle frame 20. The rear housing 10 is placed at one side of the metal middle frame 20 along a thickness direction. A first slit 221 and a second slit 222 are defined in the bottom frame portion 22. Along an extending direction of the side frame portion 21, a third slit 50 is defined between the rear housing 10 and the bottom frame portion 22. One end of the third slit 50 is communicated with the first slit 221, and the other end of the third slit 50 is communicated with the second slit 222. It is understood that, the bottom frame portion 22 is divided into three sections by the first slit 221 and the second slit 222, and the third slit 50 is defined between the rear housing 10 and a middle section between the first slit 221 and the second slit 222. Two side sections beside the middle section of the bottom frame portion 22 are correspondingly connected with the two side frame portions 21, respectively. Thus, a n-typed gap is formed by the first slit 21, the second slit 22, and the third slit 50, and the whole housing is divided into a larger portion (including the rear housing 10, the top frame portion 23, the side frame portions 21 and the side sections) and a smaller portion (including the middle section).

A feeding point 31, a first ground point 32 and a second ground point 33 are provided on the mainboard 30. The feeding point 31 is connected with a first position 223 of the bottom frame portion 22. The first ground point 32 is connected with a second position 224 of the bottom frame portion 22. The second ground point 33 is connected with a third position 225 of the bottom frame portion 22 by the first tuning switch 40. The first position 223, the second position 224 and the third portion 225 are located between the first slit 221 and the second slit 222, and the second position 224 is located between the first position 223 and the third position 225, thereby forming a first antenna, a second antenna and a third antenna.

By using the above-described antenna system, the housing is separated into the metal middle frame 20 and the rear housing 10, the slit is defined only in the bottom frame portion 22 of the metal middle frame 20 and between the bottom frame portion 22 and the rear housing 10, and only one communicated gap is defined, thereby separating the housing into a larger portion and a smaller portion. Apparently, compared with an area of the slits in the three-piece structure, an area of the slits in the above-described structure decreases greatly, and only a small portion of the bottom frame portion 22 is removed from the housing, so that there is less influence on the overall structural strength of the housing, the overall structural strength can be improved, and the visual quality can be improved.

The first tuning switch 40 has a connected state, a disconnected state, an inductor access state, and a capacitor access state. When the first tuning switch 40 is in the connected state, the second ground point 33 is connected with the bottom frame portion 22 and specifically, the second ground point 33 is electrically connected with the middle section. When the first tuning switch 40 is in the disconnected state, the second ground point 33 is disconnected from the bottom frame portion 22 and specifically, the second ground point 33 is disconnected from the middle section. When the first tuning switch 40 is in the inductor access state, the second ground point 33 is connected with the bottom frame portion 22 by an inductor, specifically, the second ground point 33 is connected with the middle section by the inductor, and an inductance value of the inductor can be 3 NH. When the first tuning switch 40 is in the capacitor access state, the second ground point 33 is connected with the bottom frame portion 22 by a capacitor, and specifically, the second ground point 33 is connected with the middle section by the capacitor. By using the above-described first tuning switch 40, different states of the first tuning switch 40 can be controlled to adjust the bandwidths of the frequency bands of the first antenna and the second antenna, so as to facilitate adjustment of the antenna system without the need to change different access components or mainboards.

It should be noted that, the above-described capacitor can be an adjustable capacitor, or can include various capacitors with different capacitance values. Optionally, the capacitor is the adjustable capacitor, for further facilitating the adjustment of the antenna system. Whether the capacitor is the adjustable or includes various capacitors with different capacitance values, the capacitance value of the capacitor can be 0.8 pf or 1.2 pf, and so on.

In the above-described antenna system, a part of the bottom frame portion 22 located on a side of the first position 223 away from the second slit 222 can generate a first harmonic and a high order harmonic, and the part of the bottom frame portion 22 located on the side of the first position 223 away from the second slit 222, and the rear housing 10 are coupled to each other, and cooperatively generate a first harmonic and a high order harmonic. A resonant frequency of the first harmonic is within the working frequency band of the first antenna, and a resonant frequency of the high order harmonic is within the working frequency band of the second antenna. That is to say, a main radiator of the first antenna and the second antenna includes the part of the bottom frame portion 22 located on the side of the first position 223 away from the second slit 222, i.e., a main radiator of the first antenna and the second antenna includes a part of the middle section located between the first position 223 and the first slit 221, and a side section close to the first slit 221. The working band of the first antenna is in a range of 824 MHZ-960 MHZ, and the working band of the second antenna is in a range of 1710 MHZ-2170 MHZ.

A part of the bottom frame portion 22 located on a side of the first position 223 away from the second position 224, and the rear housing 10 are coupled to each other, and cooperatively generate a high frequency harmonic. A resonant frequency of the high frequency harmonic is within the working frequency band of the third antenna. That is to say, a main radiator of the third antenna includes the part of the bottom frame portion 22 located on the side of the first position 223 away from the second position 224, i.e., a main radiator of the third antenna includes a part of the middle section located on the first position 223 and the second slit 222, and a side section close to the second slit 222. The working band of the third antenna is in a range of 2300 MHZ-2690 MHZ.

Furthermore, as shown in FIGS. 1-3, the antenna system further includes an antenna unit 60 and a second tuning switch 70. The antenna unit 60 is connected with the bottom frame portion 22 by the second tuning switch 70, and the second tuning switch 70 is placed on a side of the second slit 222 away from the first slit 221. By adding the antenna unit 60 and the second tuning switch 70, the antenna unit 60 can be electrically connected with the side section by the second tuning switch 70, so that the antenna unit 60 can be used as a parasitic antenna, and is coupled to a part of the middle section between the first position 223 and the second slit 222 for forming a fourth antenna, thereby adding the frequency bands of the antenna system.

Specifically, the antenna unit 60 includes a metal wiring. The metal wiring can be a flexible printed circuit (Flexible Printed Board, PFC), or can be directly formed by a laser direct structuring (Laser Direct Structuring, LDS) process. The metal wiring is arranged opposite to and spaced from the bottom frame portion 22. One end of the metal wiring is connected with the bottom frame portion 22 by the second tuning switch 70, and the other end of the metal wiring is a free end. Optionally, the metal wiring is parallel to the bottom frame portion 22.

The second tuning switch 70 has a connected state and a disconnected state. When the second tuning switch 70 is in the connected state, the antenna unit 60 is connected with the bottom frame portion 22 to couple the antenna unit 60 to the bottom frame portion 22, thereby forming the fourth antenna. When the second tuning switch 70 is in the disconnected state, the antenna unit 60 is disconnected from the bottom frame portion 22. That is to say, as needed, by adjusting states of the second tuning switch 70, the antenna unit 60 can be connected with or disconnected from the bottom frame portion 22, to control whether to form the fourth antenna or not.

For ensuring an electrical length of the fourth antenna, the metal wiring is arranged opposite to parts of the bottom frame portion 22 located on two sides of the second slit 222 and opposite to the second slit 222. That is to say, the metal wiring extends from the side section close to the second slit 222 to the middle section through the second slit 222 to ensure the coupling of the antenna unit 60 to the side section.

After adding the antenna unit 60, the part of the bottom frame portion 22 located on the side of the first position 223 away from the second position 224 is coupled to the antenna unit 60 to generate a harmonic of 3.5 G, whose resonant frequency is within a working frequency band of the fourth antenna. That is to say, a main radiator of the fourth antenna includes the antenna unit 60 and the part of the bottom frame portion 22 located on the side of the first position 223 away from the second position 224, i.e., a main radiator of the fourth antenna includes the antenna unit 60, a part of the middle section located between the first position 223 and the second slit 222, and the side section close to the second slit 222. A working frequency band of the fourth antenna is in a range of 3400 MHZ-3800 MHZ, which can meet the development requirement of 5 G.

Figure 4:
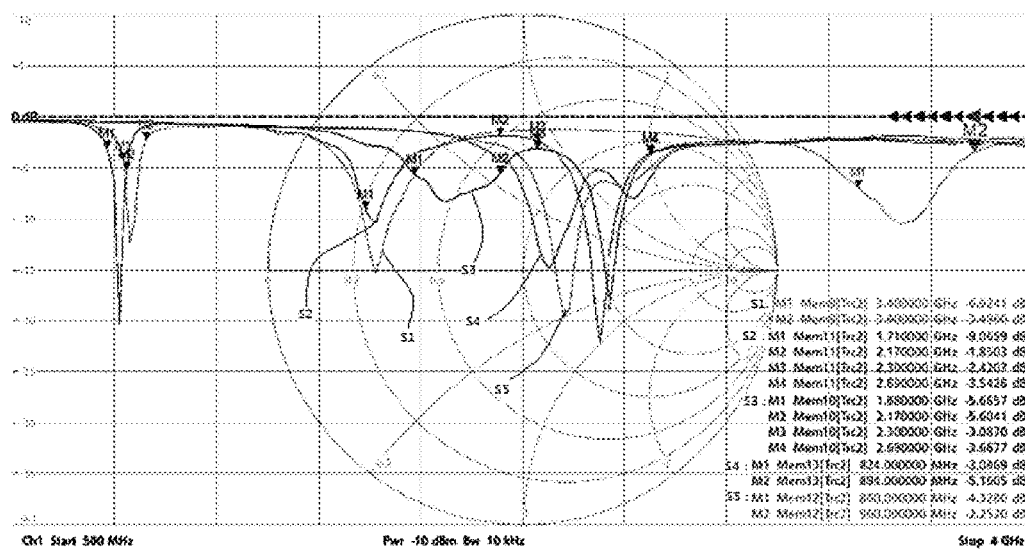
FIG. 4 is a return-loss plot of an antenna system according to an embodiment of the present disclosure.
Figure 5:
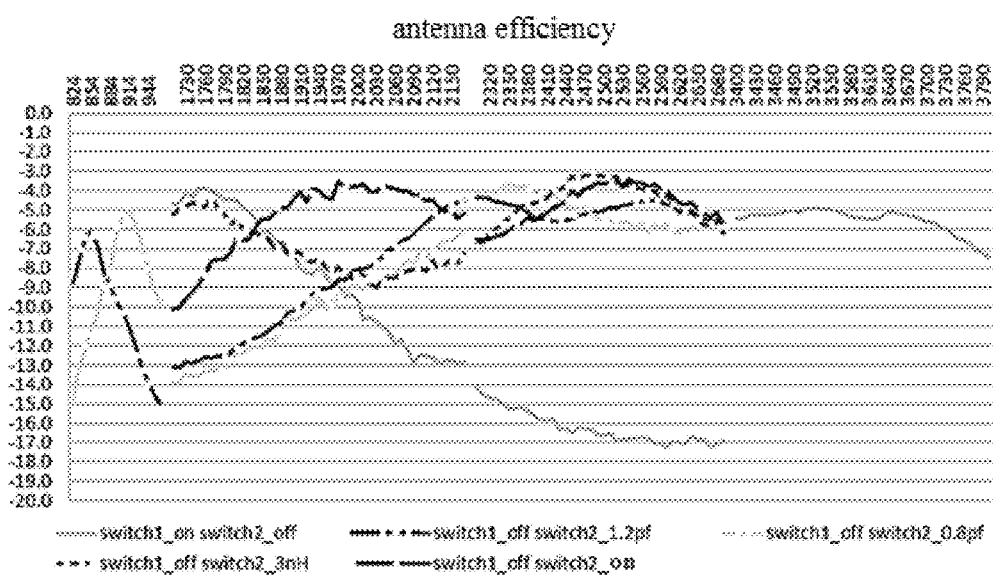
FIG. 5 is an antenna efficiency diagram of an antenna system according to an embodiment of the present disclosure.

When the antenna system includes both the first tuning switch 40 and the second tuning switch 60, by adjusting different states of the first tuning switch 40 and the second tuning switch 60, a return-loss plot of the antenna system is obtained in FIG. 4, and an antenna efficiency diagram of the antenna system is obtained in FIG. 5. In FIG. 4, curve S1 is a return-loss curve of the antenna system when the second tuning switch 60 is in the connected state and the first tuning switch 40 is in the disconnected state; curve S2 is a return-loss curve of the antenna system when the second tuning switch 60 is in the disconnected state and the first tuning switch 40 is in the inductor access state; curve S3 is a return-loss curve of the antenna system when both the second tuning switch 60 and the first tuning switch 40 are in the disconnected state; curve S4 is a return-loss curve of the antenna system when the second tuning switch 60 is in the disconnected state and the first tuning switch 40 is in the capacitor access state with the capacitor of 1.2 pf capacitance; and curve S5 is a return-loss curve of the antenna system when the second tuning switch 60 is in the disconnected state and the first tuning switch 40 is in the capacitor access state with the capacitor of 0.8 pf capacitance. In FIG. 5, "switch 1" refers to the second tuning switch 60, "switch 2" refers to the first tuning switch 40, "off" refers to the disconnected state, and "on" refers to the connected state.

In addition, the present disclosure further provides a communication device, such as mobile phone and tablet computer, and the communication device includes the antenna system according to any embodiment as described above.

The embodiments described above are merely preferred embodiments of the present disclosure and they do not limit the present disclosure. Those skilled in the art can make various modifications and changes to the present disclosure. However, any modification, equivalent replacement and improvement made within the spirit and principle of the present disclosure shall fall within the scope of the present disclosure.

What is claimed is:

1. An antenna system, comprising:
    a rear housing,
    a metal middle frame circumferentially surrounding and connected with the rear housing, the metal middle frame comprising two side frame portions opposite to each other and a bottom frame portion connecting the two side frame portions, the bottom frame portion comprising a first position, a second position and a third position,
    a mainboard provided with a feeding point, a first ground point and a second ground point, and
    a first tuning switch, wherein
    the bottom frame portion defines a first slit and a second slit, a third slit is defined between the rear housing and the bottom frame portion along an extending direction of the two side frame portions, and one end of the third slit is communicated with the first slit, and the other end of the third slit is communicated with the second slit; and
    the feeding point is connected with the first position; the first ground point is connected with the second position; the second ground point is connected with the third position by the first tuning switch; and the first position, the second position and the third position are located between the first slit and the second slit, and the second position is located between the first position and the third position, thereby forming a first antenna, a second antenna, and a third antenna;
    the antenna system further comprising an antenna unit and a second tuning switch, wherein the antenna unit is connected with the bottom frame portion by the second tuning switch, and the second tuning switch is placed on a side of the second slit away from the first slit, for forming a fourth antenna.

2. The antenna system as described in claim 1, wherein the first tuning switch has a connected state, a disconnected state, an inductor access state and a capacitor access state;
    when the first tuning switch is in the connected state, the second ground point is connected with the bottom frame portion;
    when the first tuning switch is in the disconnected state, the second ground point is disconnected from the bottom frame portion;
    when the first tuning switch is in the inductor access state, the second ground point is connected with the metal middle frame by an inductor; and
    when the first tuning switch is in the capacitor access state, the second ground point is connected with the bottom frame portion by a capacitor.

3. The antenna system as described in claim 2, wherein the capacitor is an adjustable capacitor.

4. The antenna system as described in claim 1, wherein the antenna unit comprises a metal wiring, the metal wiring is placed opposite to and spaced from the bottom frame portion; and one end of the metal wiring is connected with the bottom frame portion by the second tuning switch, and the other end of the metal wiring is a free end.

5. The antenna system as described in claim 4, wherein the metal wiring is placed opposite to sections of the bottom frame portion on two sides of the second slit and opposite to the second slit.

6. The antenna system as described in claim 1, wherein the second tuning switch has a connected state and a disconnected state;
    when the second tuning switch is in the connected state, the antenna unit is connected with the bottom frame portion to make the antenna unit be coupled to the bottom frame portion, thereby forming a fourth antenna; and
    when the second tuning switch is in the disconnected state, the antenna unit is disconnected from the bottom frame portion.

7. The antenna system as described in claim 6, wherein a main radiator of the fourth antenna comprises the antenna unit and a part of the bottom frame portion located on a side of the first position away from the second position.

8. The antenna system as described in claim 1, wherein a main radiator of the first antenna and the second antenna comprises a part of the bottom frame portion on a side of the first position away from the second slit; and
    a main radiator of the third antenna comprises a part of the bottom frame portion located on a side of the first position away from the second position.

9. A communication device, comprising the antenna system as described in claim 1.

* * * * *